United States Patent
Kao et al.

(10) Patent No.: US 12,447,786 B2
(45) Date of Patent: Oct. 21, 2025

(54) ROCKING ARM STRUCTURE PROVIDING ADDITIONAL-WHEEL SUPPORT AND DEVICE HAVING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Chen-Ting Kao, New Taipei (TW); Chih-Cheng Lee, New Taipei (TW); Chiung-Hsiang Wu, New Taipei (TW); Sheng-Li Yen, New Taipei (TW); Yu-Cheng Zhang, New Taipei (TW); Chen Chao, New Taipei (TW); Chang-Ju Hsieh, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 592 days.

(21) Appl. No.: 17/939,100

(22) Filed: Sep. 7, 2022

(65) Prior Publication Data
US 2023/0191863 A1    Jun. 22, 2023

(30) Foreign Application Priority Data

Dec. 22, 2021   (CN) .......................... 202123247924.6

(51) Int. Cl.
*B60G 9/00*    (2006.01)
*B60G 7/00*    (2006.01)
*B60G 7/02*    (2006.01)

(52) U.S. Cl.
CPC ............. *B60G 9/003* (2013.01); *B60G 7/001* (2013.01); *B60G 7/02* (2013.01); *B60G 2500/32* (2013.01)

(58) Field of Classification Search
CPC ................ B60G 7/001; B60G 2200/13; B60G 2204/418; B60G 9/003; B60G 7/02; B60G 2500/32; F16C 2326/05
See application file for complete search history.

(56) References Cited

U.S. PATENT DOCUMENTS

| | | | | |
|---|---|---|---|---|
| 4,128,137 A | * | 12/1978 | Booth | B62D 7/00 180/907 |
| 11,213,441 B2 | * | 1/2022 | Goertzen | B60G 17/056 |
| 11,919,554 B2 | * | 3/2024 | Manz | B62B 5/02 |

FOREIGN PATENT DOCUMENTS

WO    WO-2019192648 A1 * 10/2019 .............. F16C 19/16

OTHER PUBLICATIONS

WO-2019192648-A1 Machine Translation (Year: 2019).*

* cited by examiner

*Primary Examiner* — Jake Cook
(74) *Attorney, Agent, or Firm* — ScienBiziP, P.C.

(57) ABSTRACT

A rocking arm structure includes an arm body, a motive wheel assembly connected to the arm body, a caster wheel assembly connected to the arm body, and a shaft assembly connected to the arm body and disposed between the motive wheel assembly and the caster wheel assembly. The two wheel assemblies are configured to revolve in a same direction around the shaft assembly and for example allow a 4-wheeled vehicle/robot to become a 6-wheeled vehicle for stability as required during changes of terrain.

18 Claims, 9 Drawing Sheets

ROCKING ARM STRUCTURE PROVIDING ADDITIONAL-WHEEL SUPPORT AND DEVICE HAVING THE SAME

FIELD

The subject matter herein generally relates to devices, and more particularly, to a rocking arm structure with wheels and a device having the rocking arm structure.

BACKGROUND

Devices, such as robots or vehicles, may include wheels allowing the devices to move or change directions. However, in a complicated or uneven terrain, the stability of the device and of the cargo carried by the device maybe affected. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
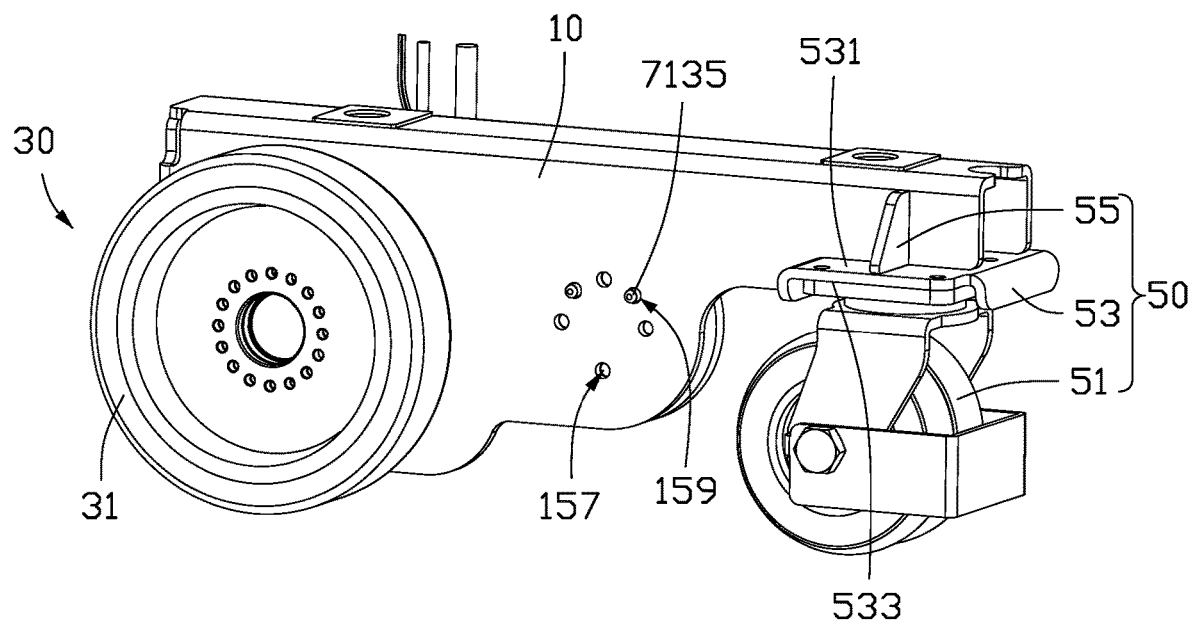
FIG. 1 is a diagrammatic view of a rocking arm structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
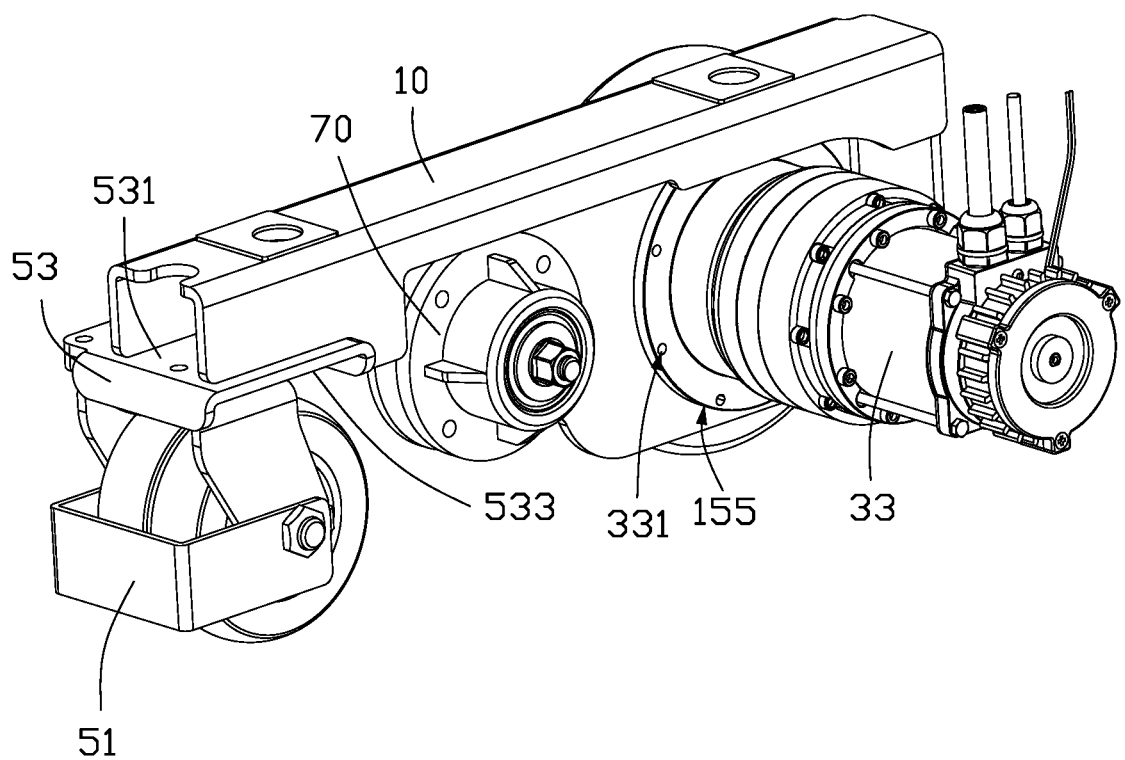
FIG. 2 is similar to FIG. 1, but showing the rocking arm structure from another angle.
Figure 3:
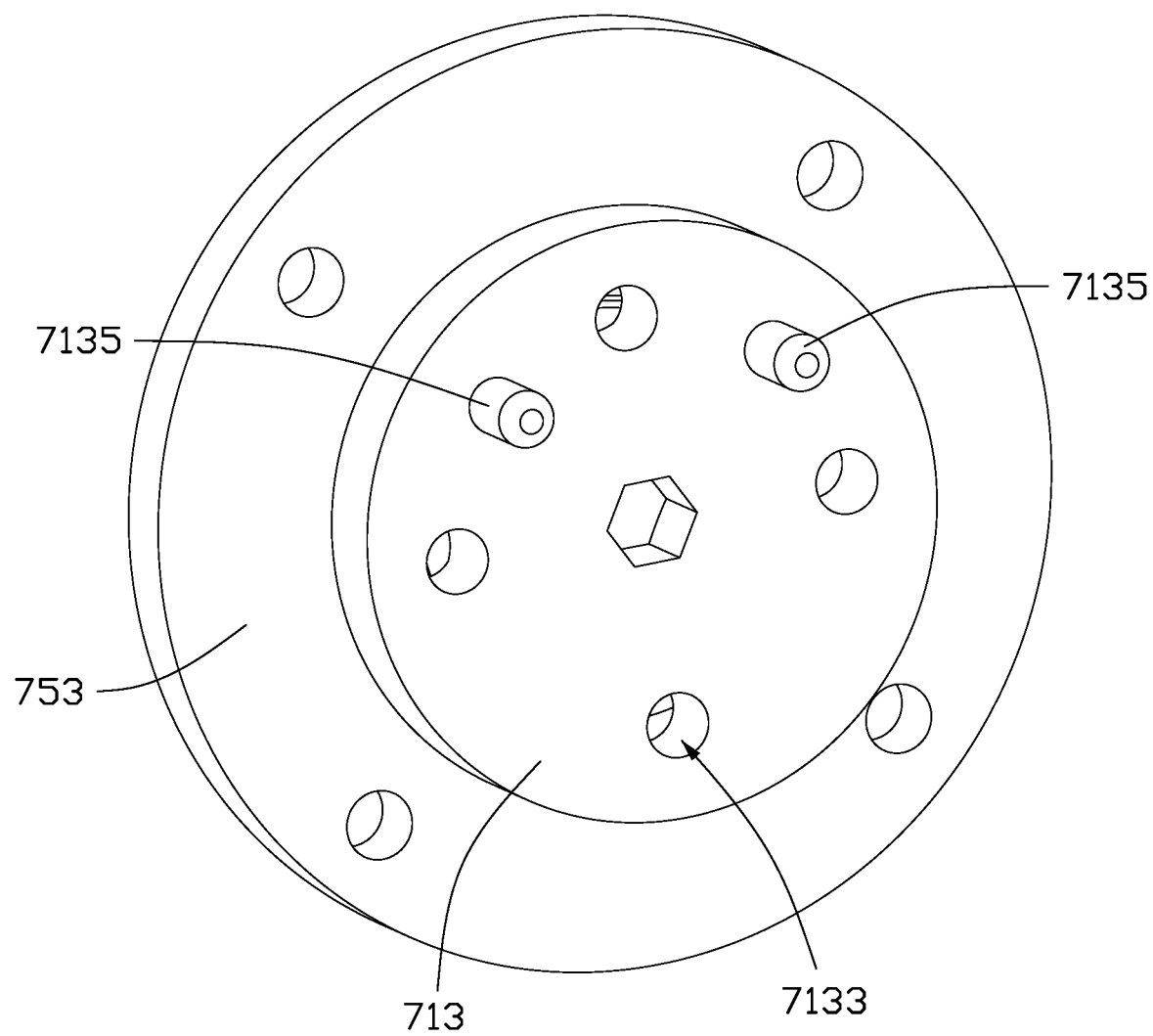
FIG. 3 is a diagrammatic view of a shaft assembly of the rocking arm structure of FIG. 1.
Figure 4:
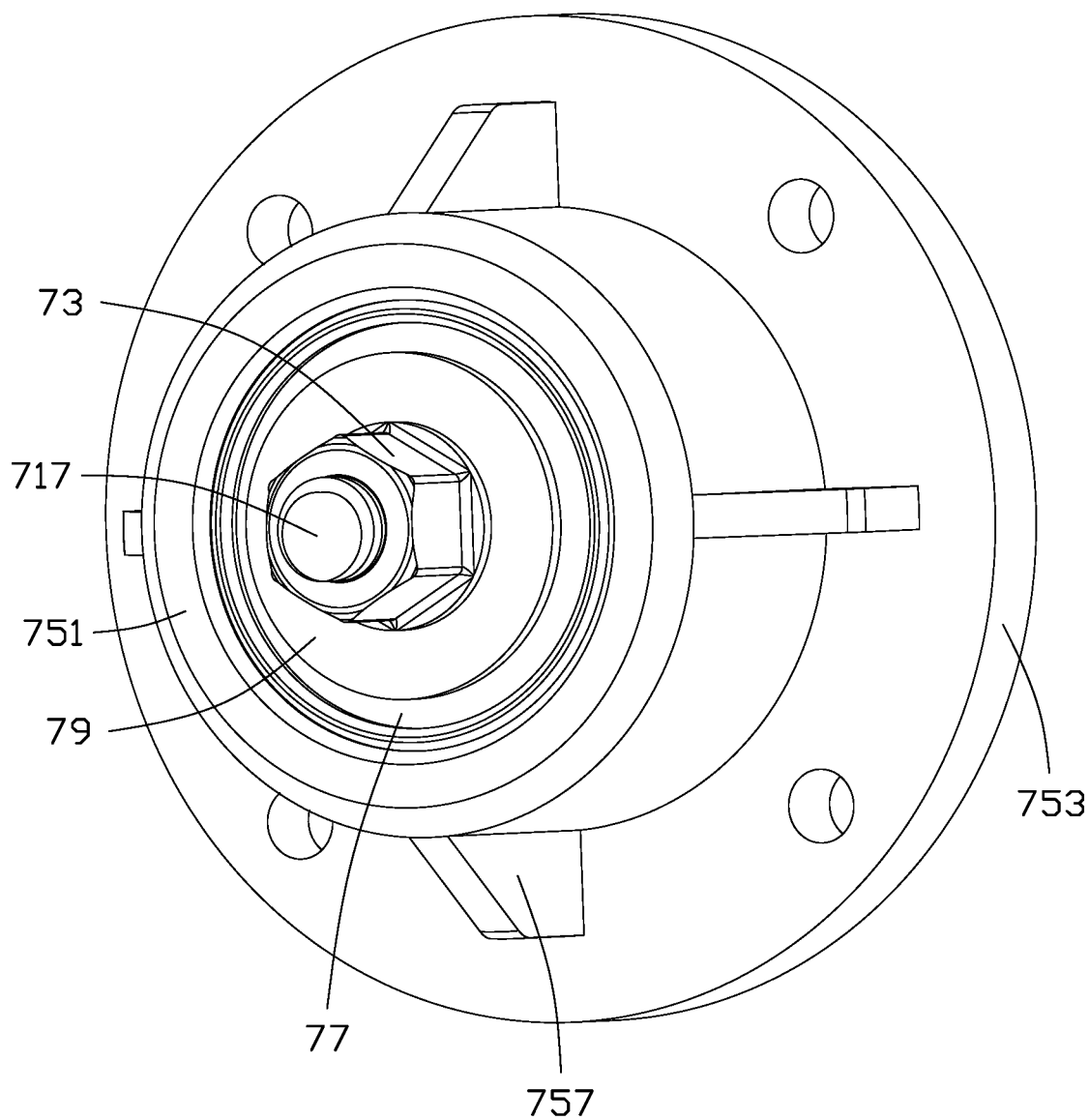
FIG. 4 is similar to FIG. 3, but showing the shaft assembly from another angle.

Referring to FIGS. 1 to 2, the present disclosure provides an embodiment of a rocking arm structure 100. The rocking arm structure 100 includes an arm body 10, a directional wheel assembly 30, a steering wheel assembly 50, and a shaft assembly 70. Each of the directional wheel assembly 30 and the steering wheel assembly 50 are connected to the arm body 10. The shaft assembly 70 is disposed between the directional wheel assembly 30 and the steering wheel assembly 50. The shaft assembly 70 is used to connect the rocking arm structure 100 to a main body 20 (shown in FIG. 9) or, in the case of a 4-wheel robot or vehicle, a pair of rocking arm structures 100 can be fitted, that is, a rocking arm structure 100 can be fitted to a main body 20 on each side of the vehicle body or robot base.

When in use, the arm body 10 can rotate relative to the main body 20 around the shaft assembly 70 to suit a change of terrain, such as one causing sudden pitching of a device. Thus, the arm body 10 drives the directional wheel assembly 30 and the steering wheel assembly 50 to revolve in a same direction around the shaft assembly 70, allowing the rocking arm structure 100 to adapt and reduce fore-and-aft pitching and maintain contact with the ground. Thus, the stability of the robot or vehicle is improved. Furthermore, the castor angle of the steering wheel assembly 50 itself allows self-steering according to the change of terrain. A sensor for detecting the change of terrain is not needed in the rocking arm structure 100, so that the structure of the rocking arm structure 100 is simplified.

In at least one embodiment, referring to FIGS. 3-6, the shaft assembly 70 includes a connecting seat 75, a shaft 71, at least one bearing 77, and a first fastener 73. The connecting seat 75 is used to connect the main body 20 (shown in FIG. 9). The connecting seat 75 defines a through hole 755, and the at least one bearing 77 is disposed in the through hole 755. The shaft 71 is rotatably disposed in the at least one bearing 77, and the bearing 77 provides smoothness and precision in movement and long service life. Since the shaft 71 can rotate in the at least one bearing 77, the directional wheel assembly 30 and the steering wheel assembly 50 can revolve in the same direction around the shaft 71.

In at least one embodiment, the shaft 71 includes a first shaft portion 713 and a second shaft portion 711 connected to the first shaft portion 713. The first shaft portion 713 may further include a convex block 7131 (shown in FIG. 6) that is provided on a surface of the first shaft portion 713 facing the second shaft portion 711. The convex block 7131 is in contact with one of the at least one bearing 77 facing the first shaft portion 713. The second shaft portion 711 includes a fastening portion 7111 protruding from one of the at least one bearing 77 away from the first shaft portion 713. The first fastener 73 surrounds and connects to the fastening portion 7111. Thus, the at least one bearing 77 is fixed between the first fastener 73 and the convex block 7131. In at least one embodiment, the fastening portion 7111 may be a threaded stud, and the first fastener 73 may be a nut. The convex block 7131 may be a truncated pyramid.

In at least one embodiment, the shaft assembly 70 further includes a gasket 79. The gasket 79 is disposed between the first fastener 73 and one of the at least one bearing 77 adjacent to the first fastener 73.

Figure 5:
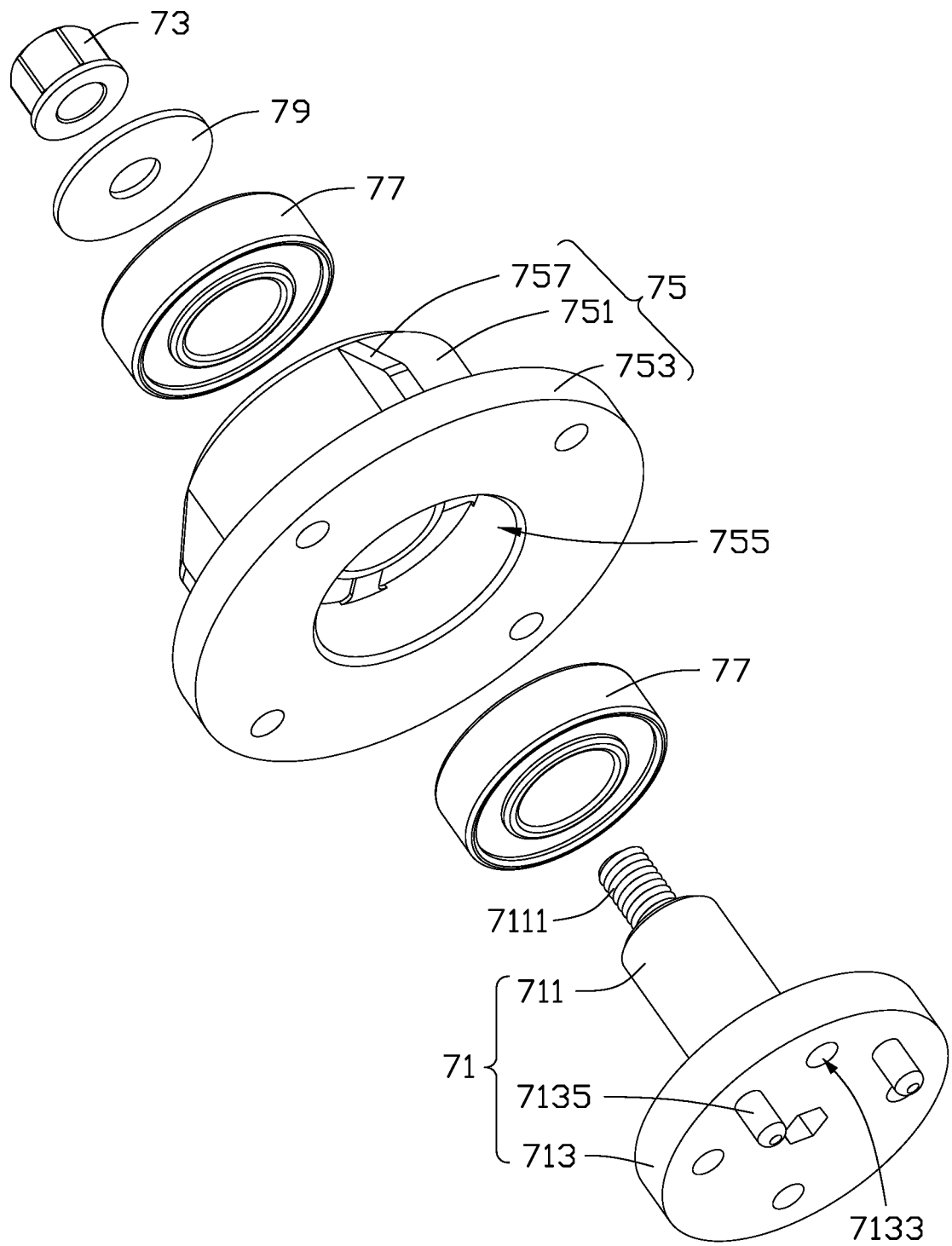
FIG. 5 is an exploded view of the shaft assembly of FIG. 3.
Figure 6:
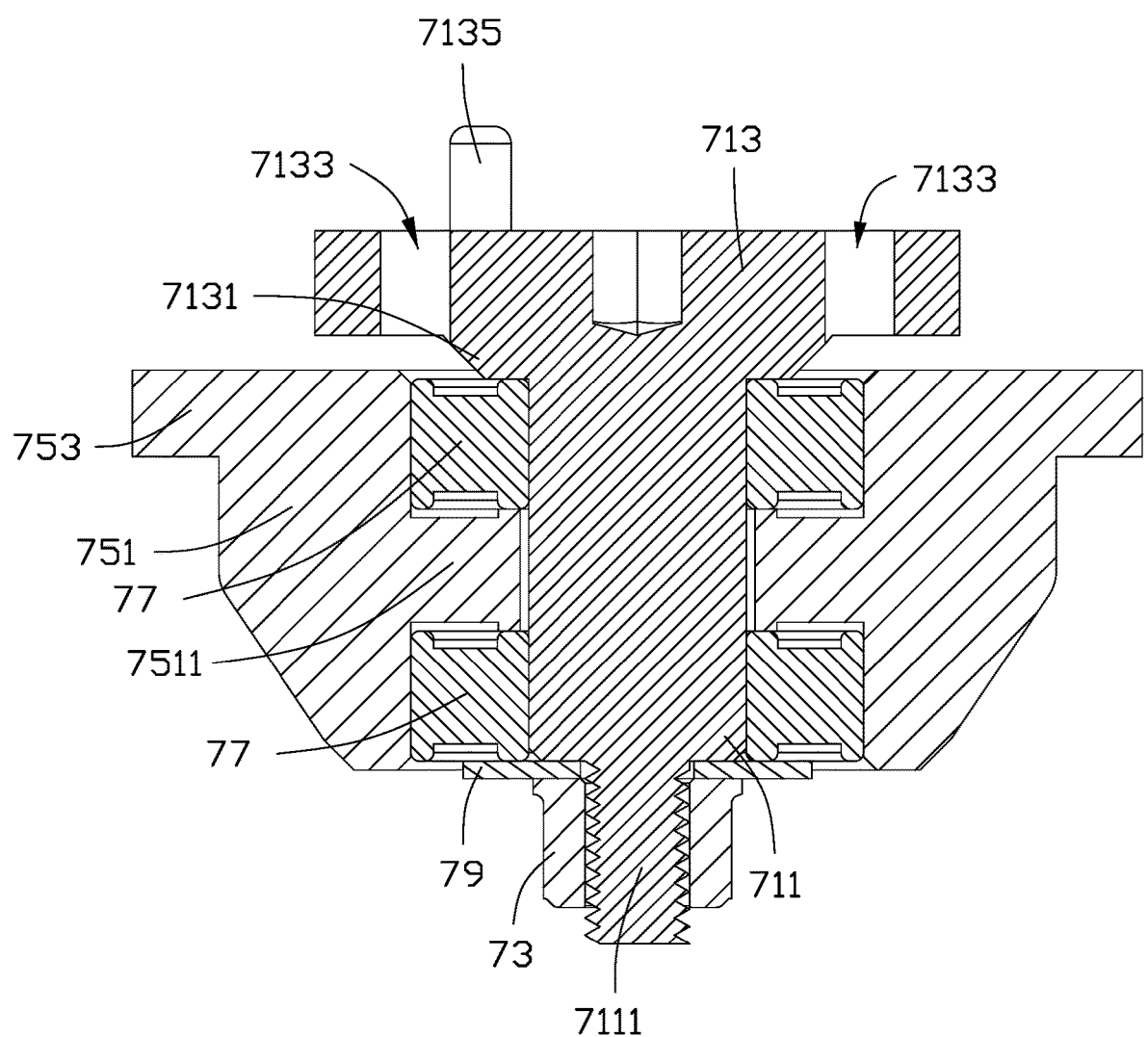
FIG. 6 is a cross-sectional view of the shaft assembly of FIG. 3.

In this embodiment, referring to FIG. 5 and FIG. 6, the shaft assembly 70 includes two bearings 77. A flange 7511 protrudes from an inner wall of the through hole 755. The flange 7511 is disposed between and abuts against the two bearings 77.

In at least one embodiment, referring to FIGS. 1, 5, and 6, the first shaft portion 713 defines a first mounting hole 7133. The arm body 10 defines a second mounting hole 157. The rocking arm structure 100 further includes a second fastener (such as a screw bolt, not shown), which passes through the first mounting hole 7133 and the second mounting hole 157 to connect the arm body 10 and the shaft assembly 70 together. A protrusion 7135 further protrudes from an end surface of the first shaft portion 713 away from the second portion 711. The arm body 10 further defines a second mounting hole 159, and the protrusion 7135 is inserted into the second mounting hole 159. During assembly, the protrusion 7135 is inserted into the second mounting hole 159. Then, the second fastener passes through the first mounting hole 7133 and the second mounting hole 157 to connect the arm body 10 and the shaft assembly 70 together.

In at least one embodiment, referring to FIGS. 5 and 6, the connecting seat 75 includes a first seat portion 751 and a second seat portion 753 connected to each other. The first seat portion 751 and the second seat portion 753 may be coaxial. An outer diameter of the first seat portion 751 is smaller than that of the second seat portion 753. The connecting seat 75 further includes a number of first reinforcing ribs 757 surrounding the first seat portion 751. In at least one embodiment, each first reinforcing rib 757 is substantially triangular, and adjacent sides of the first reinforcing rib 757 are connected to the first seat portion 751 and the second seat portion 753. The first reinforcing ribs 757 increase the strength of the connecting seat 75.

In at least one embodiment, referring to FIGS. 1 and 2, the directional wheel assembly 30 includes an orientation wheel 31 and a driver 33 connected to the orientation wheel 31. The driver 33 is further connected to the arm body 10. The driver 33 can drive the orientation wheel 31 to rotate.

Figure 7:
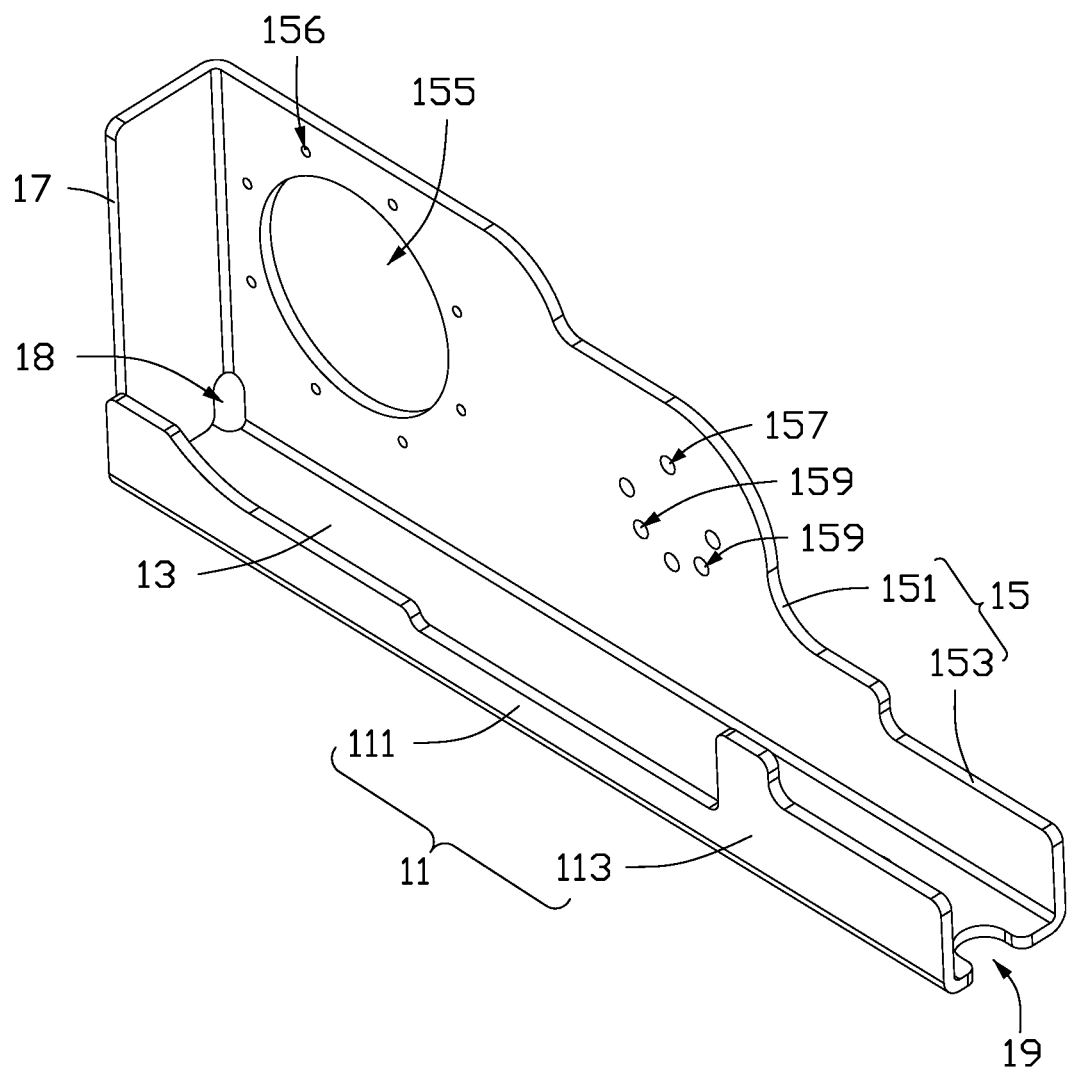
FIG. 7 is a diagrammatic view of an arm body of the rocking arm structure of FIG. 1.
Figure 8:
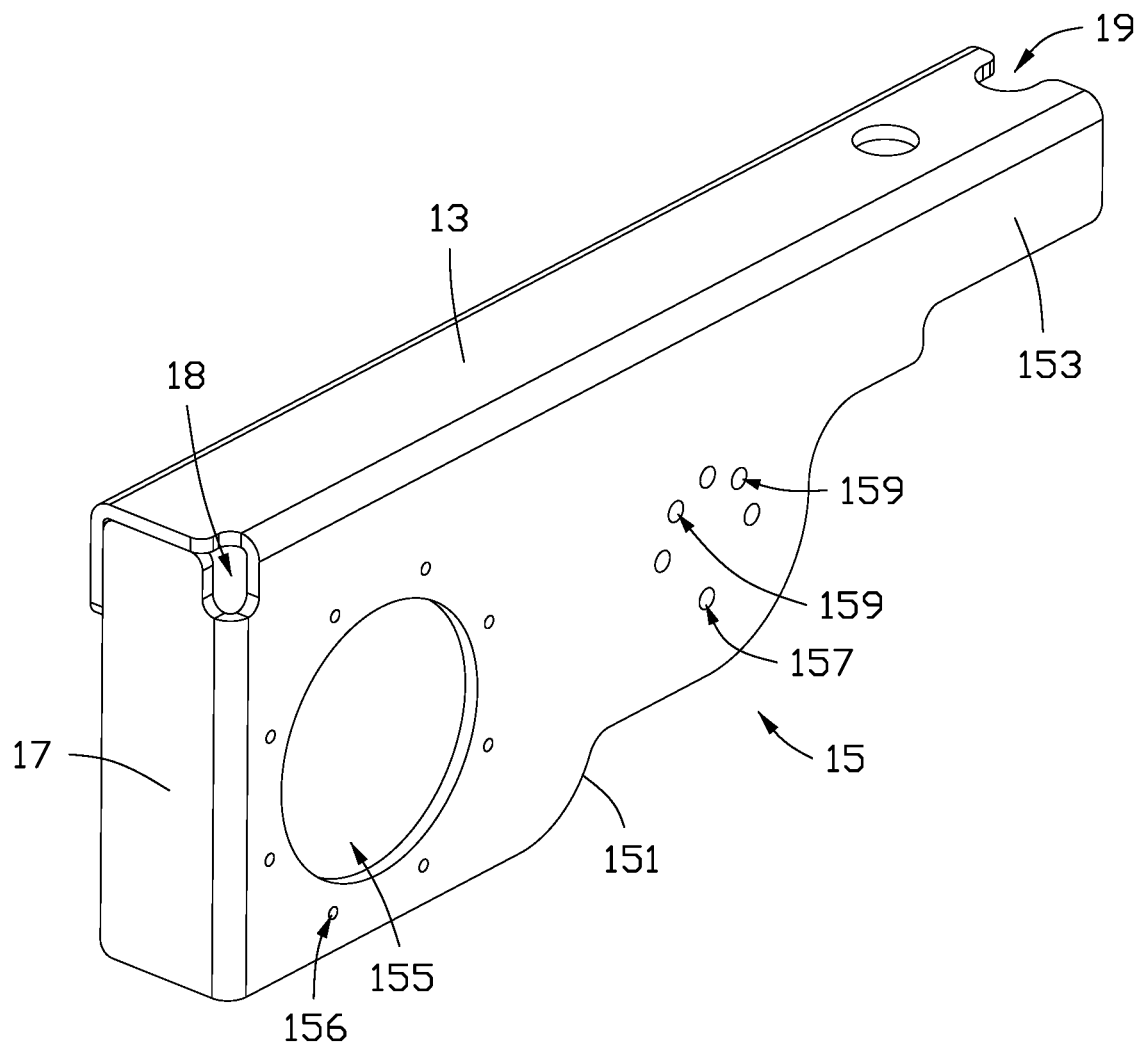
FIG. 8 is similar to FIG. 7, but showing the arm body from another angle.

In this embodiment, referring to FIGS. 7 and 8, the arm body 10 also defines a third mounting hole 155, and the driver 33 is fixed in the third mounting hole 155. The arm body 10 also defines a number of fourth mounting holes 156 surrounding the third mounting hole 155. The driver 33 defines a number of fifth mounting holes 331 (shown in FIG. 2). A third fastener (not shown) passes through one fourth mounting hole 156 and the corresponding fifth mounting hole 331, so that the driver 33 and the arm body 10 are connected together. As such, the rocking arm structure 100 can be mounted to the main body 20.

In this embodiment, referring to FIGS. 1 and 2, the steering wheel assembly 50 includes a steering wheel (caster wheel) 51 and a connecting member 53. The connecting member 53 includes a first connecting end 531 and a second connecting end 533 opposite to the first connecting end 531. The first connecting end 531 is connected to the arm body 10, and the second connecting end 533 is connected to the steering wheel 51. In at least one embodiment, the steering wheel assembly 50 further includes a second reinforcing rib 55. The second reinforcing rib 55 is substantially triangular, and adjacent sides of the second reinforcing rib 55 are connected to the arm body 10 and the second connecting end 533. The second reinforcing rib 55 increases the strength of the steering wheel assembly 50. In this embodiment, the steering wheel 51 is a wheel with caster angle to follow direction of movement of vehicle or robot.

In at least one embodiment, referring to FIGS. 7 and 8, the arm body 10 includes a first plate 11, a second plate 13, and a third plate 15. The second plate 13 is connected between the first plate 11 and the third plate 15. The first plate 11 and the third plate 15 are spaced apart from each other. The first plate 11 includes a first plate portion 111 and a second plate portion 113 connected to each other. The third plate 15 includes a third plate portion 151 and a fourth plate portion 153 connected to each other. A height of the second plate portion 113 relative to the third plate 15 is equal to a height of the fourth plate portion 153 relative to the third plate 15.

The connecting member 53 of the steering wheel assembly 50 is mounted on the second portion 113 and the fourth portion 153. A height of the first plate portion 111 relative to the third plate 15 is less than a height of the third plate portion 151 relative to the third plate 15.

The arm body 10 may also further include a fourth plate 17. The fourth plate 17 is connected to the first plate 11, the second plate 13, and the third plate 15. The fourth plate 17 increases the strength of the arm body 10.

In at least one embodiment, the arm body 10 further defines a first notch 18 and a second notch 19. The first notch 18 is provided at a junction of the second plate 13, the third plate 15, and the fourth plate 17. The second notch 19 is provided at an edge of the second plate 13 away from the fourth plate 17. The first notch 18 and the second notch 19 avoids cracking of the arm body 10 under stress concentration.

In this embodiment, the second mounting hole 159, the third mounting hole 155, and the fourth mounting hole 156 are all defined on the third plate portion 151.

Figure 9:
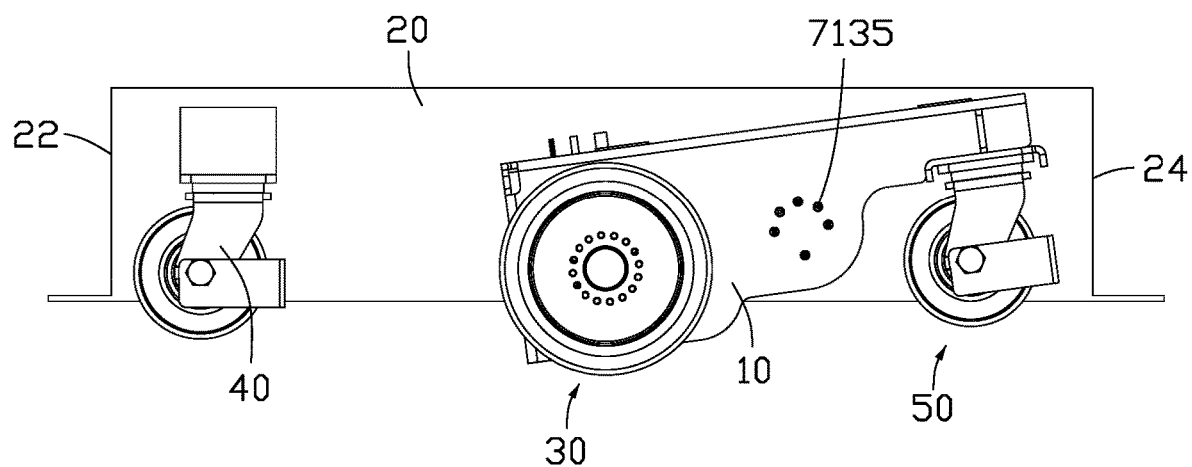
FIG. 9 is a diagrammatic view of a device according to an embodiment of the present disclosure.

Referring to FIG. 9, the present disclosure also provides an embodiment of a device 200. The device 200 may be a self-powered device such as a vehicle. In another embodiment, the device 200 may also be a robot. The device 200 includes a main body 20 and at least one of the above-mentioned rocking arm structure 100. The at least one rocking arm structure 100 is connected to the main body 20 through the shaft assembly 70. In at least one embodiment, the device 200 includes two rocking arm structures 100, which are disposed at opposite surfaces of the main body 20.

In at least one embodiment, the device 200 also includes other two steering wheel assemblies 40 disposed at opposite surfaces of the main body 20. The main body 20 includes a first moving end 22 and a second moving end 24 opposite to the first moving end 22. The rocking arm structures 100 are adjacent to the second moving end 24. The steering wheel assemblies 40 are adjacent to the first moving end 22. In other embodiments, the steering wheel assemblies 40 may be replaced by other two directional wheel assemblies.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A rocking arm structure comprising:
    an arm body;
    a directional wheel assembly connected to the arm body;
    a steering wheel assembly connected to the arm body; and
    a shaft assembly connected to the arm body and disposed between the directional wheel assembly and the steering wheel assembly, wherein the directional wheel assembly and the steering wheel assembly are configured to revolve in a same direction around the shaft assembly;
    wherein the arm body comprises a first plate, a second plate, and a third plate; the second plate is connected between the first plate and the third plate; the first plate comprises a second plate portion, the third plate comprises a fourth plate portion, a height of the second plate portion relative to the third plate is equal to a height of the fourth plate portion relative to the third plate; the steering wheel assembly is mounted on the second plate portion and the fourth plate portion.

2. The rocking arm structure according to claim 1, wherein the shaft assembly comprises a connecting seat, a shaft, and a fastener; the connecting seat defines a through hole, the shaft is rotatably received in the through hole and connected to the arm body.

3. The rocking arm structure according to claim 2, wherein the shaft assembly further comprises at least one bearing disposed in the through hole, and the shaft is rotatably disposed in the at least one bearing.

4. The rocking arm structure according to claim 3, wherein the shaft comprises a first shaft portion and a second shaft portion connected to the first shaft portion, the second shaft portion is connected to the arm body; the first shaft portion comprises a convex block on a surface of the first shaft portion facing the second shaft portion; the second shaft portion comprises a fastening portion protruding from one of the at least one bearing away from the first shaft portion; the shaft assembly further comprises a first fastener fixed to the fastening portion, thereby causing the at least one bearing to be fixed between the first fastener and the convex block.

5. The rocking arm structure according to claim 4, wherein the at least one bearing comprises two bearings; a flange protrudes from an inner wall of the through hole; the flange is disposed between and abuts against the two bearings.

6. The rocking arm structure according to claim 4, wherein a protrusion is provided on an end surface of the first shaft portion away from the second shaft portion; the arm body defines a protrusion inserted into a mounting hole of the arm body.

7. The rocking arm structure according to claim 2, wherein the connecting seat comprises a first seat portion and a second seat portion connected to each other, an outer diameter of the first seat portion is smaller than an outer diameter of the second seat portion; the connecting seat further comprises a first reinforcing rib, each of adjacent sides of the first reinforcing rib is connected to the first seat portion and the second seat portion respectively.

8. The rocking arm structure according to claim 1, wherein the directional wheel assembly comprises a directional wheel and a driver, the driver is connected to the directional wheel and the arm body, the driver is configured to drive the directional wheel to rotate.

9. The rocking arm structure according to claim 1, wherein the steering wheel assembly comprises a steering wheel and a connecting member; the connecting member comprises a first connecting end and a second connecting end opposite to each other; the first connecting end is connected to the arm body, the second connecting end is connected to the steering wheel.

10. A device comprising:
a main body; and
a rocking arm structure comprising:
an arm body;
a directional wheel assembly connected to the arm body;
a steering wheel assembly connected to the arm body; and
a shaft assembly connecting the arm body to the main body, the shaft assembly disposed between the directional wheel assembly and the steering wheel assembly, wherein the directional wheel assembly and the steering wheel assembly are configured to revolve in a same direction around the shaft assembly;
wherein the arm body comprises a first plate, a second plate, and a third plate; the second plate is connected between the first plate and the third plate; the first plate comprises a second plate portion, the third plate comprises a fourth plate portion, a height of the second plate portion relative to the third plate is equal to a height of the fourth plate portion relative to the third plate; the steering wheel assembly is mounted on the second plate portion and the fourth plate portion.

11. The device according to claim 10, wherein the shaft assembly comprises a connecting seat, a shaft, and a fastener; the connecting seat defines a through hole, the shaft is rotatably received in the through hole and connected to the arm body.

12. The device according to claim 11, wherein the shaft assembly further comprises at least one bearing disposed in the through hole, and the shaft is rotatably disposed in the at least one bearing.

13. The device according to claim 12, wherein the shaft comprises a first shaft portion and a second shaft portion connected to the first shaft portion, the second shaft portion is connected to the arm body; the first shaft portion comprises a convex block on a surface of the first shaft portion facing the second shaft portion; the second shaft portion comprises a fastening portion protruding from one of the at least one bearing away from the first shaft portion; the shaft assembly further comprises a first fastener fixed to the fastening portion, thereby causing the at least one bearing to be fixed between the first fastener and the convex block.

14. The device according to claim 13, wherein the at least one bearing comprises two bearings; a flange protrudes from an inner wall of the through hole; the flange is disposed between and abuts against the two bearings.

15. The device according to claim 13, wherein a protrusion is provided on an end surface of the first shaft portion away from the second shaft portion; the arm body defines a protrusion inserted into a mounting hole of the arm body.

16. The device according to claim 11, wherein the connecting seat comprises a first seat portion and a second seat portion connected to each other, an outer diameter of the first seat portion is smaller than an outer diameter of the second seat portion; the connecting seat further comprises a first reinforcing rib, each of adjacent sides of the first reinforcing rib is connected to the first seat portion and the second seat portion.

17. The device according to claim 10, wherein the directional wheel assembly comprises a directional wheel and a driver, the driver is connected to the directional wheel and the arm body, the driver is configured to drive the directional wheel to rotate.

18. The device according to claim 10, wherein the steering wheel assembly comprises a steering wheel and a connecting member; the connecting member comprises a first connecting end and a second connecting end opposite to each other; the first connecting end is connected to the arm body, the second connecting end is connected to the steering wheel.

* * * * *